July 6, 1937.  N. CAMPANI  2,086,470

ANTISKID ATTACHMENT FOR THE WHEELS OF VEHICLES

Filed Jan. 4, 1935

Inventor
Nello Campani
By B. Singer
Attorney

Patented July 6, 1937

2,086,470

UNITED STATES PATENT OFFICE 2,086,470

ANTISKID ATTACHMENT FOR THE WHEELS OF VEHICLES

Nello Campani, Triest, Italy

Application January 4, 1935, Serial No. 433
In Italy September 30, 1933

3 Claims. (Cl. 152—14)

This invention relates to anti-skid devices, more particularly for application to the wheels and tires of motor-propelled road vehicles, and has for its object to provide an improved device of this nature. A further object of the invention is to provide a device of this nature which is capable of being readily and easily applied to rubber-tired wheels without the necessity for jacking up the wheels off the ground or for removing the wheels or rims. A further object of the invention is to ensure firm and rigid attachment of the device in position on the wheel. A further object is to prevent slacking of or damage to the means of attachment of the device during the rotation of the wheel to which it is applied under load.

In the drawing, in which like numbers of reference indicate like parts in all figures, Fig. 1 is a cross section of a portion of a wire spoke wheel with the invention applied.

Figure 1:
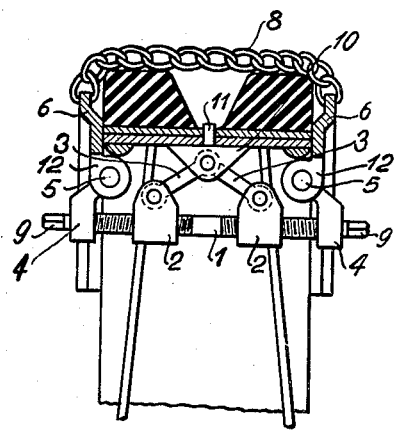
Figure 2:
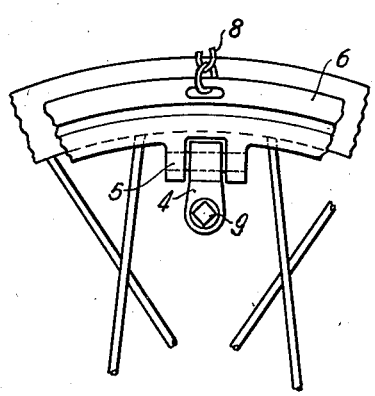
Fig. 2 is a side elevation of the same.

In the form shown in Figs. 1 and 2, a bearing block 10 is pressed against the inner surface of the wheel rim by means of two short levers 3 attached to two travelling nuts 2. These nuts are threaded on to a spindle 1 which is provided with right-hand and left-hand threading on either side of its mid point, and which is mounted with its cylindrical ends in bearings 4 articulately attached by means of bolts 5 to the side plates 6. Each of the outer ends of the spindle 1 is provided with a square section or hexagonal head 9 by means of which it can be rotated in either direction with the aid of a suitable tool. It will be clear that rotation of this spindle in one direction will bring the two travelling nuts 2 nearer together while rotation thereof in the other direction will move these nuts farther apart. In the former case the bearing block 10 is pressed by the two levers 3 against the inner side of the wheel rim, the clearance between the threaded spindle and the wheel rim being thereby increased and powerful tension exerted upon the side plates 6. The anti-skid elements are thereby firmly pressed against the outer surface of the tire in the manner already described. With this type of straining means it is possible to undo the connection between one of the bearings 4 and the appropriate side plate 6 by withdrawal of the pin 5 on the side concerned. After the tightening up of the unit on the wheel this pin is locked in a known manner against displacement in or removal from the hinge.

Figure 3:
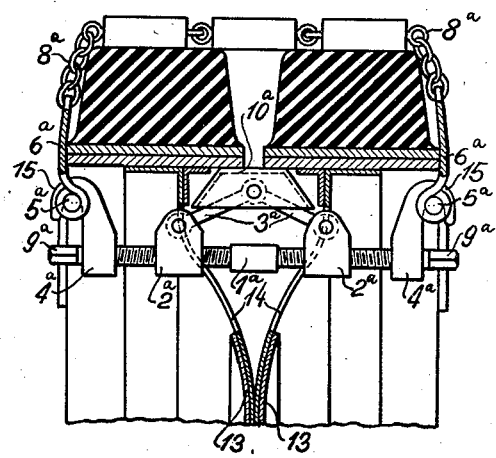
Fig. 3 is a cross section of a modification.
Figure 4:
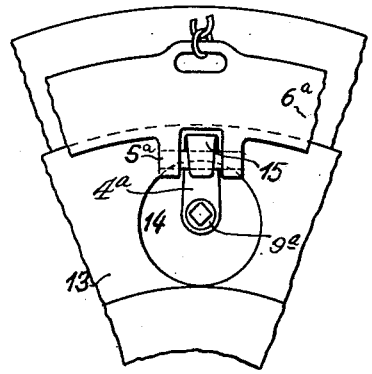
Fig. 4 is a side elevation thereof.

Similar straining means for use in conjunction with an anti-skid device consisting of cylindrical sections are shown in Figs. 3 and 4 of the drawing. In this case the bearings 4a engage the side plates 1 by means of hooks 9a. In contrast to the last described example, the wheel in the present instance is a disc wheel having two discs 13 connected together by means of the hub of the wheel and apertures 14 through which the straining device is passed for coupling and tightening up. The trapezoidal bearing block 10a is positioned with its front surface in contact with the under side of the wheel rim, and is guided between the two discs 13 of the wheel and thereby prevented from becoming laterally displaced.

It is to be understood that the described constructions are intended to serve as examples only, adduced for the reader understanding of the invention, and that detail modifications of a constructional nature such as would occur to anyone skilled in the art could be made without departing from the spirit and scope of the invention.

What I claim is:

1. An anti-skid device comprising a set of independent detachable units each consisting of two side members, anti-skid elements articulately attached to and bridging the upper edges of the said members, bearings articulated to the said side members, a screw threaded spindle rotatably mounted in the said bearings, the screw threading on the said spindle being right-handed on one side of its mid point and left-handed on the other side of the said point, a travelling nut threaded on to the said spindle on each side of the said mid point, levers attached to the said travelling nuts, a bearing block articulated to the said levers and adapted to bear against the under side of the rim of the said wheel, and tool faces on the outer ends of the said spindle.

2. An anti-skid device as claimed in claim 1 in which the said bearings are provided with hooks and adapted to be inserted into engagement with apertures in the said side members, and further comprising means for preventing displacement of the said spindle in the said apertures.

3. In anti-skid devices of the independent detachable type for wheels having tires mounted on rims and in which devices tread elements overtie the tread face of the tire; means for fastening said tread elements in place, said means comprising two side plates conforming substantially to the curvature of the wheel and designed to lie adjacent the sides of the rim and to which plates the anti-skid elements are attached, a retaining device hingedly connected at its ends to said side plates and passed beneath the rim, said retaining device being operatively connected with the rim to pivot on an axis located in the mid-plane of the wheel whereby said device may rock about its pivot to permit deformations to occur in the tire in use without slipping the tread elements laterally on the tire tread, and means to secure said retaining device in place against lateral displacement, said retaining device including a cross-bar and said last named means including a fulcrum block, a link connection between said cross-bar and said fulcrum block.

NELLO CAMPANI.